UNITED STATES PATENT OFFICE.

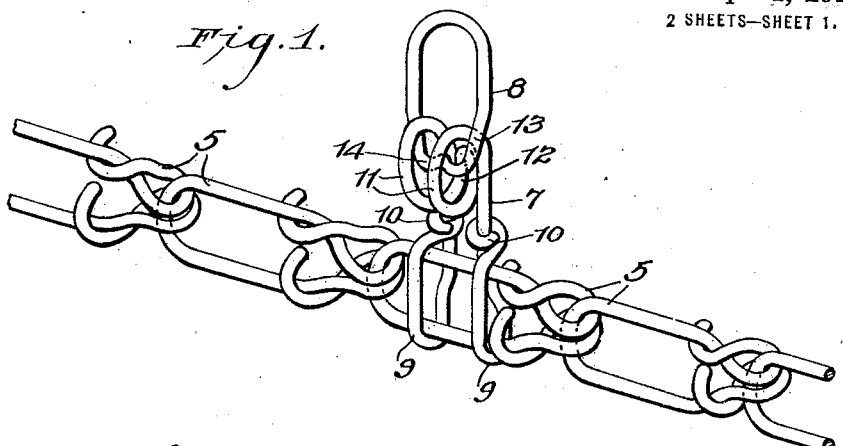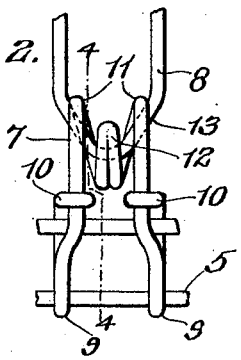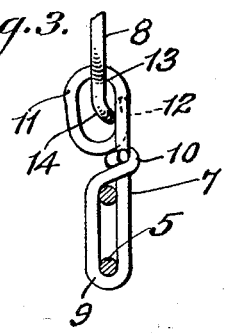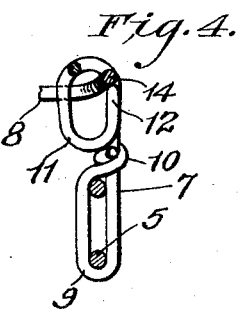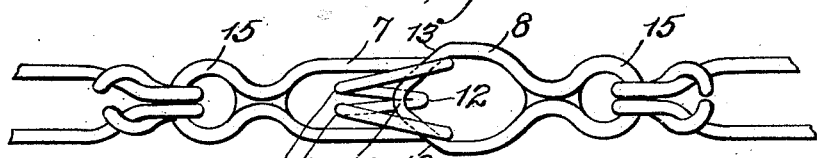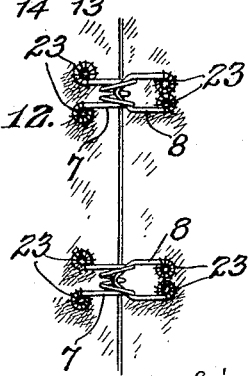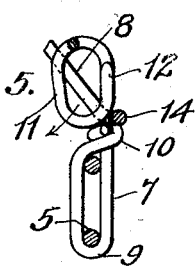

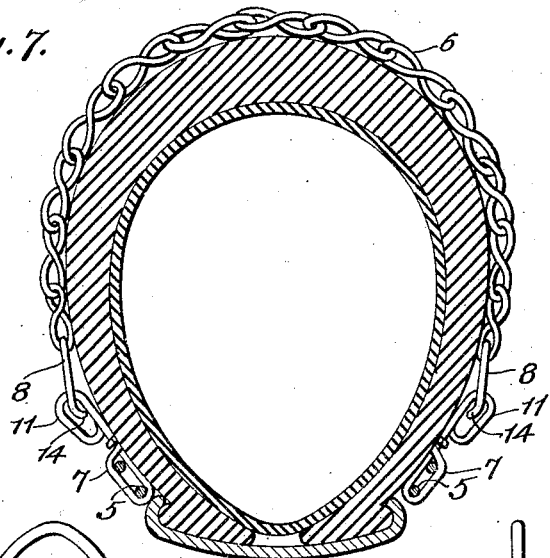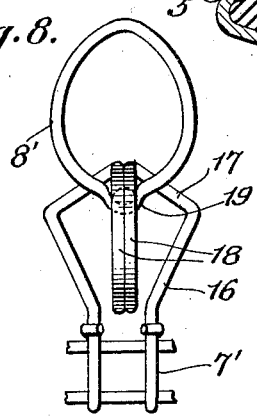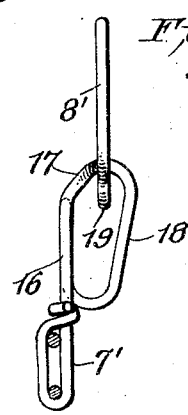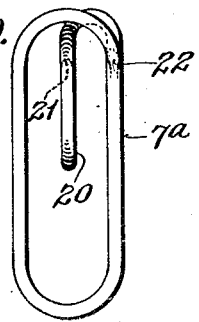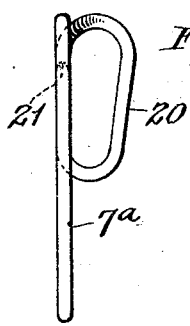

LEON OTTINGER, OF NEW YORK, N. Y.

SEPARABLE FASTENER.

1,411,580.   Specification of Letters Patent.   Patented Apr. 4, 1922.

Application filed July 8, 1921. Serial No. 483,194.

*To all whom it may concern:*

Be it known that I, LEON OTTINGER, a citizen of the United States, and resident of the borough of Manhattan, city, county, and State of New York, have invented certain new and useful Improvements in Separable Fasteners, of which the following is a specification.

This invention relates to separable fasteners and in its generic aspect has for its object and purpose to provide a fastener of this type in which the complementary elements of the fastener are so constructed that they may be very easily and quickly connected to each other so as to preclude the possibility of their accidental separation, while they may also be as readily disconnected by a simple manual manipulation.

More particularly, the present invention contemplates the provision of a reliable detachable fastening or connection between the circumferential side chains and the tread chains of the familiar anti-skidding means for vehicle wheel tires which is very generally used by motorists. By means of the present construction, I aim to effectively prevent accidental disconnection of the terminal links of the tread chains from the side or circumferential chains and to provide a separable connection between said chains having maximum strength and durability and in which the use of leaf springs or other easily breakable elements is eliminated.

It is also an object of the present invention to provide a separable fastener as above characterized which may likewise be employed for connecting together the ends of the circumferential tire chains, and in an alternative embodiment may be advantageously utilized as a hook and eye connection between the edges of garments and for numerous other analogous purposes.

With the above and other objects in view, the invention consists in the improved separable fastener and in the form, construction and relative arrangement of its several parts as will be hereinafter more fully described, illustrated in the accompanying drawings and subsequently incorporated in the subjoined claims.

In the drawings wherein I have illustrated several desirable and practical embodiments of the invention and in which similar reference characters designate corresponding parts throughout the several views:

Figure 1 is a perspective view illustrating the application of one form of the invention to motor vehicle tire chains, Figure 2 is a rear side elevation of the fastener, Figure 3 is an elevation looking at right angles to Figure 2, Figure 4 is a vertical sectional view taken on the line 4—4 of Figure 2 and showing the initial relative positions of the complementary fastener members in disconnecting the same, Figure 5 is a similar view showing another relative position of the parts, Figure 6 is an elevation illustrating the invention as applied to the end of the circumferential tire chains, Figure 7 is a transverse section through a wheel tire showing a tread chain connected to the side chains by means of my improved fasteners, Figure 8 is an elevation showing a slightly modified form of the invention, Figure 9 is a view of the construction shown in Figure 8 looking at right angles thereto, Figure 10 is a detail elevation showing another modification of the primary fastening member, Figure 11 is a view similar to Figure 9 of the construction shown in Figure 10, and Figure 12 is an elevation showing the improved separable fastener adapted for use as a hook and eye attachment for garments.

Referring in detail to the drawings, and more particularly to Figures 1 to 5 thereof, in Figure 1 I have illustrated a portion of one of the circumferential tire chains, which I have herein shown as consisting of a plurality of flexibly connected wire links 5. It will be understood that in so far as the essential features of the present invention are concerned, any conventional type of chain links might be employed. These side chains are arranged at opposite sides of the tire casing in the usual manner, as indicated in Figure 7 of the drawings, and the ends of each chain are detachably connected. At spaced intervals transversely extending tread chains 6 are engaged around the tire casing and connected at their ends to the side chains. It has heretofore been a matter of more or less difficulty to connect or disconnect the tread chains to the side chains after the chains have been applied to the tire, and such inventions as are known in the prior art devised with this end in view have, for various reasons, been found impracticable. Thus these prior art devices in many cases require the use of tools in order to effect the connection or disconnection, or on the other hand, they include leaf springs or other relatively fragile and easily breakable parts so that the fastening elements are liable to accidental disconnection, and in addition such prior art devices are relatively complicated and difficult and expensive to manufacture.

In one embodiment of my present invention whereby the above noted deficiencies are obviated, I provide the complementary fastening members 7 and 8 respectively. The member 7 is formed from a single length of wire of requisite gauge, the end portions of which are spaced apart and each of said end portions bent upon itself as at 9 to provide substantially parallel legs between which the opposite side portions of one of the links 5 of the side chain extend. The terminals of the wire are twisted or clinched upon the respective spaced portions thereof above the chain link 5 as shown at 10. It will be understood that the spaced parts of each bent or looped end 9 of the wire member 7 have tight frictional engagement against the opposite sides of the chain link 5 so as to prevent relative longitudinal shifting movement.

The outwardly extending spaced portions of the wire from which the fastening member 7 is formed are each outwardly and downwardly bent into the form of a loop 11, the said loops converging downwardly towards each other so that at their lower ends the loop portions of the wire are in proximate relation. The intermediate portion of the wire which connects the loops 11 to each other extends upwardly from the lower ends of the loops and provides a hook bill 12 which is disposed in the plane of the spaced parallel portions of the wire. This hook bill is centrally located between said spaced wire portions and the upwardly projecting terminal thereof is located above the center line passing through the spaced loops 11.

The other fastening member 8 which constitutes the end link of the transverse tread chain is likewise in the form of a wire loop, said loop in the present instance being formed of one continuous wire strand and closed at both ends. One end of this loop is contracted in width, or in other words, the side portions of the loop at its ends are convergently inclined inwardly towards each other as at 13. The connection between these inclined side portions 13 of the loop is angularly bent or offset as at 14 out of the plane of said side portions, thus producing a laterally deflected bend at this end of the loop. It is to be particularly noted that in this construction the loops 11 are spaced apart at their upper ends for a distance substantially equal to the space between the inner sides of the parallel portions of the loop 8.

In connecting the fastening members to each other, the terminal link 8 of the tread chain constituting one of the fastening members is engaged over the outwardly projecting converging portions of the loops 11 and the offset end 14 of the link 8 is moved inwardly around the lower ends of said loops and then upwardly between the loops and the parallel portions of the member 7 until said offset end 14 is disposed above the terminal of the hook bill 12. The link 8 is then moved with respect to the member 7 to position the offset 14 through the loops 11 and centrally therebetween. The converging portions 13 of the link coacting with the widely spaced upper end portions of the loops 11 serve to maintain the offset 14 in a position below the upper end of the hook bill 12. It will be understood that the member 7 is of sufficiently heavy stock so as to resist the tendency of the portions 13 of the link 8 to force the upper ends of the loops 12 inwardly towards each other upon a longitudinal pull or strain by the tread chain.

This relative arrangement of the fastening members is fully shown in Figure 2 of the drawings. When the tread chains have been connected in the manner described, to the side chains as seen in Figure 7, it will be apparent that under all possible conditions of actual use, it is impossible for the offset end 14 of the member 8 to ride over the hook bill 12 of the member 7 so that said members might become disconnected. This connection may only be effected by moving the member 8 to a position substantially at right angles to the plane of the member 7 as seen in Figure 4 so as to dispose the converging portions 13 of the member 8 at the outer sides of the loops 11 and thus permit the offset 14 to be forced over the hook bill 12. From this position the link 8 is then turned or swung with respect to the member 7 to move the converging portions 13 thereof downwardly between the sides of the hook bill and the side portions of the member 7, the end of said member 8 being finally brought outwardly beneath the lower ends of the loops 11, as indicated in Figure 5 of the drawings. There is sufficient slack in the side chains and the tread chains to permit of this manual manipulation of the link 8 so that the connection or disconnection can be readily effected. It will thus be seen that by means of my improved fastener, should any tread chain become broken it may be readily detached from the side chains and a new tread chain substituted therefor. By the elimination of all springs or other yieldable fastening connections between the tread and side chains, the breakage of said parts or their failure to properly function is obviated, thus precluding every possibility of the accidental disconnection of the side and tread chains.

In Figure 6 of the drawings I have illustrated the fastener as applied to the ends of the side chains. The essential features of the device are exactly the same as in the construction above described, the only difference being in the form of the ends of the fastening members whereby they are connected to the links of the side chains. As illustrated, I have shown each fastening member provided with an eye 15 at one end for this purpose. However, it is apparent that this connecting means may be variously modified in order to enable the application of the device to chains of different types.

In Figures 8 and 9 of the drawings I have disclosed another desirable embodiment of the invention wherein the member 7' has its side portions extended upwardly and outwardly in divergent relation to each other as at 16. From the upper ends of these portions 16, the two portions of the wire extend upwardly and outwardly in convergent relation to each other as at 17 and from the upper ends of these portions 17, the two portions of the wire are formed into loops 18, which, however, in this case, are in close contact with each other throughout their length. The intermediate portion of the wire constituting the inner or rear sides of these loops terminates in the upwardly projecting hook bill located in the plane of the side portions 16 of the fastening member as in the construction first described.

The complementary fastening member 8' consists of a wire loop or link of any preferred form having an outwardly projecting bend 19 therein. In this case, this bend is not angularly deflected or offset, but extends in the plane of the link. Upon a comparison of Figures 8 and 9, it will be seen that when the parts are connected, the link 8' at opposite sides of the bend 18 therein engages against the upper portions 17 of the member 7'. Any movement of the end of the link 8' towards the hook bill of the loops 18 tends to move the link 8' longiudinally of the member 7' owing to the riding contact of the link 8' against the converging portions 17 of the member 7'. Thus the bend 19 in the link 8' when in contact with the inner sides of the loops 18 is disposed below the upper end of the hook bill so that it cannot ride over the same. Therefore, in this construction also it will be apparent that in order to effect a disconnection, it is necessary to first position the link 8' at an extreme angle with respect to the loops 18, which relative angular relation the parts would never assume under any conditions attending the use of the device.

In Figures 10 and 11 I have shown still another alternative construction wherein the member 7ª is formed of a single length of wire bent into an elongated loop. At one end of this loop, one end portion of the wire is bent and extended through the main loop and said end formed into a secondary or subsidiary loop 20, the outer side of which is preferably convergently inclined longitudinally towards the main loop. The inner side of this secondary loop formed from the terminal portion of the wire provides the hook bill 21, the extremity of which is above the center of the loop 20 and slightly spaced from the upper end thereof. The other extremity of the wire from which the member 7ª is formed is welded or otherwise permanently and immovably connected as shown at 22 to one side portion of said member.

From the foregoing description of the other constructions, the manner in which the complementary fastening member may be connected to or disconnected from the member 7ª, will be readily understood without necessitating a more extended explanation.

In Figure 12 of the drawings, I have illustrated my invention as adapted to use as a hook and eye fastener for garments. The essential features of the fastening members are identical with those illustrated in Figures 1 to 5 inclusive, the only difference being that the members are formed of much lighter stock and each wire member terminates in the eyes 23, by means of which said members may be securely stitched to the opposite edges of a garment opening in the usual manner. My invention particularly lends itself for use as a garment fastener of this character since the two parts are of exceedingly simple construction and do not involve a multiplicity of complicated bends or twists in the wire. Also the connection of the hook and eye elements can be very easily and quickly made and when connected, owing to the fact that the eye member projects in an opposite direction to the hook member 10 and is disposed in overlapping relation to the latter, any possibility of accidental disconnection is obviated.

From the foregoing description considered in connection with the accompanying drawings, the construction and several advantages of the different embodiments of the invention will be fully understood. While I have herein suggested several uses to which the present improvement might be advantageously applied, it will be at once obvious that the device is also applicable to many other analogous uses. The specific form in which I have illustrated the complementary fastening members, is not an essential consideration, as the forms or shapes of these members which might be adopted is a matter of individual choice or may be determined from the necessities of each particular case. The essential and fundamental distinction between the present improvement and the prior art devices resides in the disposition of the terminal hook bill of the loop or loops of one member with respect to the connected end of the other member whereby the possibility of accidental separation is obviated.

Accordingly it is to be understood that my present invention is not necessarily limited to the specific form of the several parts as herein described but the privilege is reserved of adopting all such legitimate changes therein as may be fairly embodied within the spirit and scope of the invention as claimed.

I claim:

1. A separable fastener comprising complementary members, one of said members having a part formed into a loop and terminating in a hook bill disposed in the plane of one side of said loop in spaced relation to and extending away from the attaching end of the member, the other of said members consisting of a loop adapted to be engaged over the loop of the first member, said latter member having an offset projected bend at one end thereof to pass over the end of said hook bill when the said members are disposed in predetermined relative angular positions, whereby said members may be connected to or disconnected from each other.

2. A separable fastener comprising complementary tread members, one of said members having a part formed into a loop and terminating in a hook bill disposed in the plane of one side of said loop and laterally spaced relation thereto and extending away from the attaching end of the member, and said member comprising a main body including substantially parallel portions connected to the hook bill by portions, each arranged substantially in a plane, the other of said members consisting of a loop adapted to be disposed in a plane at right angles to the plane of the loop of the first member, said latter member at one of its ends having an angularly offset portion and adapted to be engaged over said loop of the first member and moved between the opposite side portions of the loop, said offset portion of the latter member passing over the end of the hook bill when said members are disposed in predetermined relative angular positions whereby said members may be connected to or disconnected from each other.

3. A separable fastener comprising complementary members, one of said members having loops the major axes of which are convergently disposed and said loops connected by a hook bill disposed between and in the plane of the corresponding side portions of said loops, the other of said members consisting of a loop adapted to be connected to the loops of the first member and having an offset bend at one of its ends, said second member adapted for engagement over the loops of said first member and being angularly turned with respect thereto and moved between the hook bill and the outer side portions of the loops of said first member to pass said offset bend of the second member over the terminal of the hook bill whereby said members may be connected to or disconnected from each other.

4. A separable fastener comprising complementary members each formed of a length of wire, one of said members having laterally spaced convergently related loops formed therein and a hook bill connecting said loops and centrally disposed between and in the plane of the corresponding side portions of the loops, said hook bill terminating adjacent to one end of the loops, the other of said members consisting of a loop adapted to be connected to the loops of the first member and having one of its ends contracted and formed with an offset bend therein, said contracted end of the second member adapted to be moved around said hook bill and between the same and the adjacent side portions of the loops to position the offset bend of said second member beyond the terminal of the hook bill when the said members are disposed in predetermined angular positions whereby the contracted end of said second member may be engaged against the outer sides of the loops of the first member and with the bend therein disposed between said loops and inwardly of the terminal of the hook bill.

In testimony that I claim the foregoing as my invention, I have signed my name hereunder.

LEON OTTINGER.